US008312064B1

(12) United States Patent
Gauvin

(10) Patent No.: US 8,312,064 B1
(45) Date of Patent: Nov. 13, 2012

(54) METHOD AND APPARATUS FOR SECURING DOCUMENTS USING A POSITION DEPENDENT FILE SYSTEM

(75) Inventor: William J. Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 1879 days.

(21) Appl. No.: 11/126,663

(22) Filed: May 11, 2005

(51) Int. Cl.
G06F 12/00 (2006.01)
G06F 11/30 (2006.01)
(52) U.S. Cl. .......................................... 707/822; 713/193
(58) Field of Classification Search ............... 707/1, 822
See application file for complete search history.

(56) References Cited

U.S. PATENT DOCUMENTS

| 5,036,518 | A | * | 7/1991 | Tseung | 714/748 |
| 5,757,916 | A | * | 5/1998 | MacDoran et al. | 380/258 |
| 5,922,073 | A | | 7/1999 | Shimada | |
| 5,953,419 | A | * | 9/1999 | Lohstroh et al. | 713/165 |
| 6,370,629 | B1 | * | 4/2002 | Hastings et al. | 711/163 |
| 6,961,641 | B1 | * | 11/2005 | Forth et al. | 700/295 |
| 6,985,588 | B1 | * | 1/2006 | Glick et al. | 380/258 |
| 2003/0035544 | A1 | * | 2/2003 | Herle et al. | 380/270 |
| 2003/0229786 | A1 | * | 12/2003 | Hollis et al. | 713/168 |
| 2005/0114711 | A1 | * | 5/2005 | Hesselink et al. | 713/201 |
| 2005/0124319 | A1 | * | 6/2005 | Williams et al. | 455/411 |
| 2005/0144437 | A1 | * | 6/2005 | Ransom et al. | 713/151 |

OTHER PUBLICATIONS

Srivatsa, Harsha, "Location-Based Security for Wireless Apps", Nov. 19, 2002, IBM Developer Works.
Denning, Dorothy E., et al., "Location-Based Authentication: Grounding Cyberspace for Better Security", Computer Fraud & Security, Feb. 1996.
Denning, Dorothy E., Protection and Defense of Intrusion, Mar. 5, 1996.

* cited by examiner

*Primary Examiner* — Tarek Chbouki
(74) *Attorney, Agent, or Firm* — McKay and Hodgson, LLP; Serge J. Hodgson; Sean P. Lewis

(57) ABSTRACT

Access to information or a document is secured by a central global positioning authority that evaluates access requests in accordance with predefined policies. One component of an access request includes location information regarding at least one of the requesting entity and location of the requested resource. Access is either allowed or denied as a function of at least the requesting entity, position information and the applicable policy or policies. An encryption/decryption scheme is implemented where the encryption key is a function of the resource's position.

11 Claims, 14 Drawing Sheets

METHOD AND APPARATUS FOR SECURING DOCUMENTS USING A POSITION DEPENDENT FILE SYSTEM

FIELD OF THE INVENTION

The present invention relates to a method and system for controlling access to protected data based on location properties of not only the data, but also of a entity or application requesting access.

BACKGROUND OF THE INVENTION

The advent of the Internet and cyberspace has created a virtual world. In many respects, former limitations regarding time and geographic location no longer apply. One can access the Internet twenty-four hours a day, seven days a week and from anywhere in the world where there is an Internet access point. In addition, the proliferation of mobile devices such as laptop computers, personal digital assistants, phones with web-browser capabilities, USB memory devices and other portable devices such as the iPod from Apple, many of which possess wireless communications capabilities, removes the physical grounding of access to the Internet. With all of these opportunities for access anytime and anywhere, the uses and implementations of Internet-based operations has flourished. The access to account information, vendors, shopping, etc., has benefited today's society.

That is not to say, however, that this access from anywhere at any time does not come with some price. Accessing of sensitive personal information by those who are not authorized to possess this information is a risk. The number of incidents of identity theft, theft of proprietary or confidential information and phishing expeditions has been increasing.

An increasingly mobile work force, using smaller devices and having wireless access, has significantly increased the opportunities for proprietary or confidential information to fall into the wrong hands at the wrong location.

In the past, access to information had a "built-in" geographic component, in that only systems or terminals that were physically connected to a network gained access. Of course, the use of password and access protocols assured, to some extent, that only authorized users obtained access. Wireless and remote access, however, removes this "built-in" feature.

Many methods and systems have been proposed to control access to resources as a function of a location of a requesting user or application. It is known to use the position of a requestor as identified by a Global Positioning System (GPS) signal that is provided with a request. Rules or policies are put into place to control access to a particular resource such that a request coming from one geographic location would not be honored, whereas the same request, if received from a second geographic location, would be allowed because of compliance with the relevant policy.

SUMMARY OF THE INVENTION

In one embodiment of the present invention, a new architecture provides a flexible infrastructure to provide for security of information available on a network. A gateway provides the ability to control and secure sensitive and confidential information. The gateway introduces a mechanism to secure information on, for example, laptops and handheld devices that are easily lost or stolen, by providing a facility that controls and restricts the access of the resource based on the current position of the device that is requesting access.

In one embodiment, a Global Positioning Authority (GPA) is provided and used to control client and server access to specific resources based on security policies, access tokens and location aware protocols. As part of one embodiment of the present invention, a firewall GPA component, client position aware file system interceptor, global position access protocol and position aware applications are also provided. The position aware file system interceptor, along with a global positioning device, facilitates the management of file operations of a secure directory by cross referencing all access with the GPA. The GPA provides authentication, policy enforcement with respect to access to protected directory resources and the ability to move secure files from one location to another without compromising the security of the file.

Access policies are provided to manage global client endpoints and can be grouped together to allow common rules to be applied. In addition, the ability to distribute information or documents is controlled and a secure mechanism by which to transfer the information or documents is provided.

In one embodiment of the location aware file system, position aware applications use the GPA to manage file access on a local computer for operations such as open, read, modify, write and facilitate the ability to copy position dependent files from one location to another in a manner that allows the file to maintain correct position/encryption information associations.

In one embodiment of the present invention, a method of controlling access to a resource includes: requesting access to a first resource; in response to the access request, determining that the first resource is a protected resource; creating a request packet that comprises location information of a requesting entity; transmitting the request packet to a central authority; receiving a request response packet from the central authority; parsing the request response packet to determine if access is granted; and if access is granted, retrieving a first encryption key from the request response packet to decrypt the first resource.

The location information comprises location data retrieved from a Global Positioning System signal.

In one embodiment the first resource is stored at a first client device; and the first encryption key is specifically for the first resource stored on the first client device.

In an alternate embodiment, a method of controlling access to a resource includes: receiving a request packet comprising a request for access to a protected resource; determining, as a function of information within the request packet, whether the request for access is allowed; and if it is determined that access is allowed, returning a request response packet to a requesting entity.

Determining whether access is allowed includes: parsing the request packet to identify at least one data portion comprising at least one of: an identity of the requesting entity; a type of access being requested; location information regarding the requested resource; an attribute of the requested resource location information regarding the requesting entity; a date of the request; a time of the request; information regarding a location of a device from which the request is being sent; and accessing a policy store to determine, as a function of one or more of the parsed data portions, if the access request will be granted.

In another embodiment, a method of controlling access to a resource comprises: receiving a first request for access to a first resource located on a first system, the first request originating from a requesting entity on a second system; determining whether or not the requesting entity is allowed access to the first resource at the second system. If it is determined that access is allowed, the method then comprises: retrieving the first resource from the first system, the first resource encrypted with a first encryption key associated with the first system; decrypting the first resource with a first decryption key associated with the first system; encrypting the decrypted first resource with a second encryption key associated with the requesting entity; and sending the first resource, encrypted with the second encryption key, to the requesting entity at the second system.

The first encryption key is retrieved from a key store as a function of at least one of: an attribute of the first resource; an identity of the requesting entity; and an identity of the first system.

In another embodiment, an apparatus for controlling access to a resource comprises: means for requesting access to a first resource; means for determining, in response to the access request, that the first resource is a protected resource; means for creating a request packet that comprises location information of a requesting entity; means for transmitting the request packet to a central authority; means for receiving a request response packet from the central authority; means for parsing the request response packet to determine if access is granted; and means for retrieving, if access is granted, a first encryption key from the request response packet to decrypt the first resource.

In another embodiment, a computer program product for controlling access to a resource, comprising a computer usable medium having computer readable program code thereon, includes: program code for requesting access to a first resource; program code for, in response to the access request, determining that the first resource is a protected resource; program code for creating a request packet that comprises location information of a requesting entity; program code for transmitting the request packet to a central authority; program code for receiving a request response packet from the central authority; program code for parsing the request response packet to determine if access is granted; and program code for retrieving a first encryption key from the request response packet to decrypt the first resource if access is granted.

BRIEF DESCRIPTION OF THE DRAWINGS

The above and further advantages of the invention may be better understood by referring to the following description in conjunction with the accompanying drawings in which.

DETAILED DESCRIPTION

In one embodiment of the present invention, a new architecture defines an infrastructure to provide for security of information available on a network. A security gateway provides the ability to control and secure sensitive and confidential information. The security gateway introduces a mechanism to secure information on, for example, laptops and handheld devices that are easily lost or stolen, by providing a facility that controls and restricts the access to the resource based on the current position of the device that is requesting access.

In one embodiment, a Global Positioning Authority (GPA) is provided and used to control client and server access to specific resources based on security policies, access tokens and location aware protocols. The GPA manages encryption/decryption of secure files based on the client system, the authenticated user, the user location and the defined applicable policy. As part of one embodiment of the present invention, a firewall GPA component, client position aware file system interceptor, global position access protocol and position aware applications are also provided. The position aware file system interceptor, along with a global positioning device, facilitates the management of file operations of a secure directory by cross-referencing all accesses with the Global Positioning Authority of the gateway. The GPA provides authentication, policy enforcement with respect to access to a protected directory and its resources, and the ability to move, e.g., secured files from one location to another without compromising the security of the file.

Figure 1:
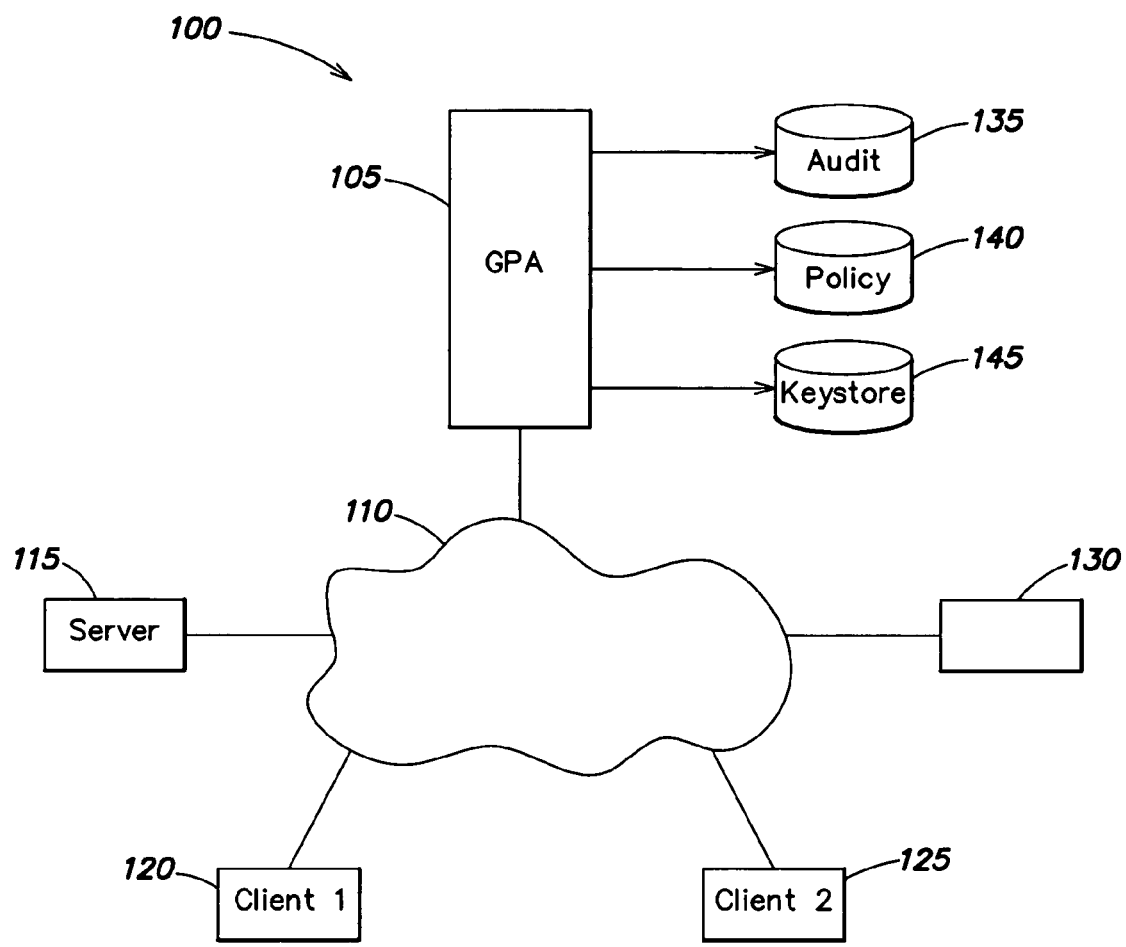
FIG. 1 is a system according to one embodiment of the present invention.

As shown in FIG. 1, a system 100 according to one embodiment of the present invention includes the Global Positioning Authority (GPA) 105 coupled to a network 110 on which any number of devices are connected to facilitate communication therebetween. As a non-limiting example, a server 115 may be connected, in addition to a first client device 120, a second client device 125 and another device 130. Only a few devices are shown connected to the network 110 for the sake of clarity. One of ordinary skill in the art would understand that any number of devices could be connected and served by the present invention. These systems or devices may be connected to the network 110 either as a wired connection or a wireless connection according to any one of a number of known protocols or mechanisms. The particular mode by which a device connects to the network 110 is not meant to be a limitation of the present invention unless specifically set forth as such. The GPA 105 includes an audit information store 135, a policy information store 140 and a key information store 145.

The GPA 105, in one embodiment, may be implemented as part of a 5400 Series Gateway device available from Symantec Corporation of Cupertino, Calif. The GPA 105 maintains the policies for all protected files of any devices that operate under a Global Position File System (GPFS), to be explained in more detail below. All access requests for files in the GPFS go through the GPA 105. As devices are moved from location to location, any access to the protected data is relayed to the GPA 105. The GPA 105 determines the policy in effect for that device based on a user, a user's position and network security attributes. The GPA 105 audits the transaction and returns an encryption key when a device is authorized. Devices use a position aware protocol to communicate with the GPA 105 and other systems protected by the GPFS and the GPA 105 is used to obtain the access tokens necessary to access the protected resources. For example, the policies may be applied to allow a user to access secured data on a device, such as a laptop, from an authorized location, such as a company work area, but restricts such access when either at home or traveling. Further, a policy may specify date and time restrictions in addition to geographic location restrictions.

The system monitors or manages client/server activities where: (1) a client requests access to a local resource; (2) a client requests access to a remote resource; (3) a server responds to a request of a client for the sharing of resources; or (4) where a protected resource is transmitted from one system to another. The GPA 105 determines whether or not a request falling under one or more of these categories will be approved based on position information and the applicable access policy.

As an overview, and one which will be explained in more detail below, there are three components of the security position system of the present invention: (1) the GPA 105, (2) a client/server Global Position File System (GPFS) and (3) a qualified application. As used herein, a qualified application is an application that has been extended to support the GPFS infrastructure whereas an unqualified application has not been so extended.

The overall control of the security position architecture functionality is implemented in the GPA 105. As above, the GPA 105 can be an extension of a network component such as a router or security gateway or may be implemented as a stand-alone network device. The GPA 105 controls access to predefined resources based on one or more of: a user ID via authentication, client IP and MAC address information from the device requesting the resource, a Global Positioning System (GPS) device's serial number information, the GPS determined position of the client, the date/time of the requested access, and the type of access and the resource being accessed. In one embodiment of the present invention, clients and servers are defined as part of the policy used in the negotiation of access tokens when clients are accessing protected resources.

A Global Position File System (GPFS) is provided on the client and server computer, for example, to provide transparent negotiation when a user, using either a qualified or an unqualified application, accesses a data store secured by the GPA 105. The server may be an application server such as web, ftp or file share that allows the sharing of files. The GPFS includes a file system interceptor that has been incorporated into the file system of each client and server. This interceptor controls all file system access to protected directories on the system. In addition to the interceptor, the GPFS contains a secure global position protocol client that is used to communicate to the GPA 105 to obtain access tokens used in the decryption of protected files as well as to manage the transmission of decrypted resources from a server to a client.

As above, an application that has been modified to use the GPFS file system extension is referred to as a qualified application. A qualified application contains a secure global position protocol client that can be used directly to receive and encrypt/decrypt secured resources.

Figure 2:
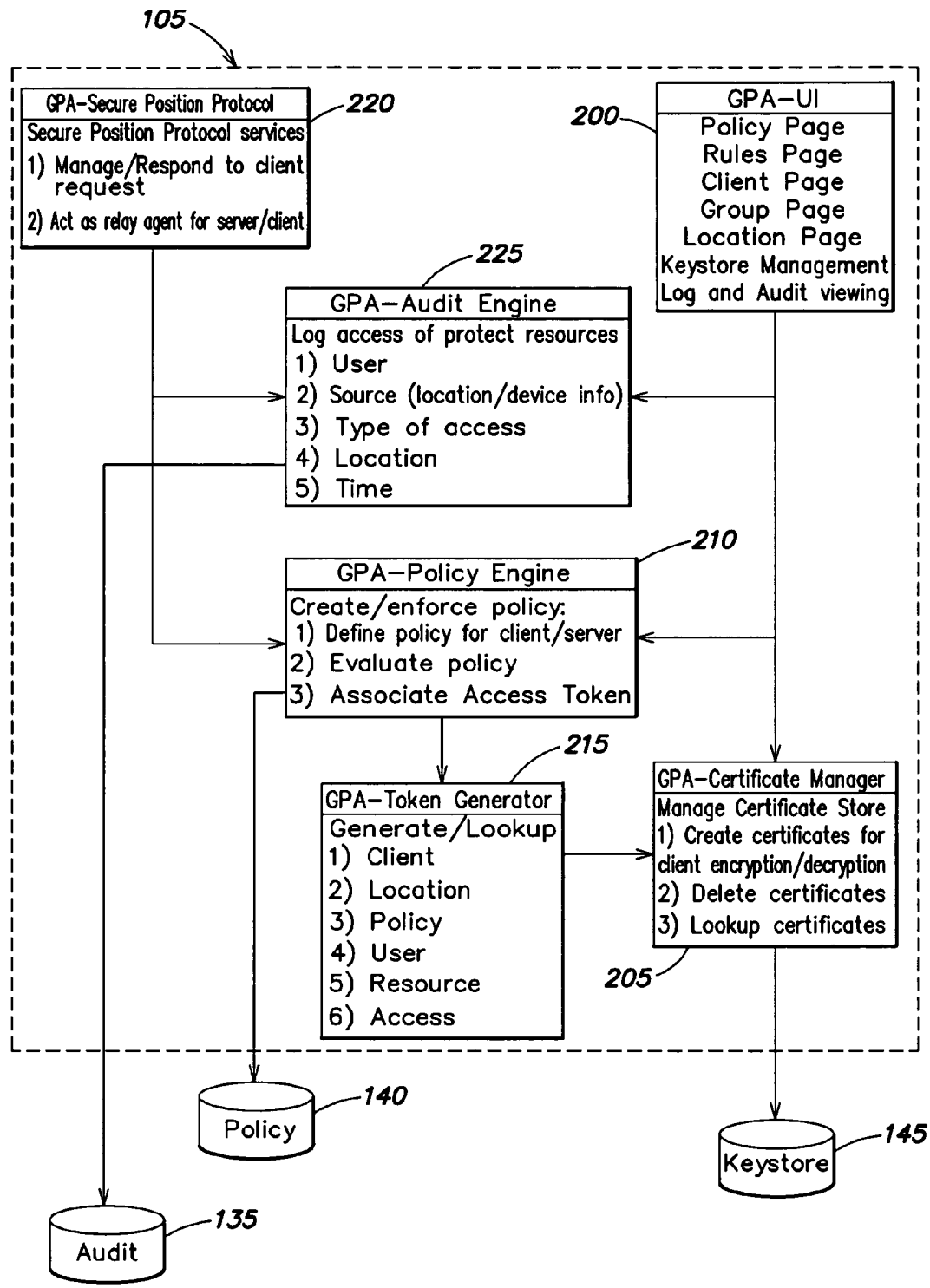
FIG. 2 is a functional block diagram of a Global Positioning Authority.

The GPA 105 may be considered as a module and may be built into an existing network device or provided as an individual service on a network. The GPA 105, as shown in FIG. 2, includes a user interface 200, a certificate manager 205, a policy engine 210, a token generator 215, a secure position protocol module 220 and an audit engine 225.

The user interface module 200 operates in coordination with the certificate manager module 205, the policy engine 210 and the audit engine 225.

The user interface module 200 is used to manage and monitor secured or protected resources. An administrator uses the user interface module 200 to assign policies associated with clients, the client locations and the resources being protected. The assignment by the administrator is facilitated through one or more of a policy page, a rules page, a client page, a group page and a location page being presented to the administrator. The administrator defines the rules and policies that control access by users, e.g., as a function of the user's location, by accessing one or more of the foregoing pages. The user interface module 200 also provides the administrator with key store management options as well as log and audit viewing to monitor system usage and performance. Specific reports may be generated to audit the activity of resources where the reports may be used by management for productivity or legal reasons. Here, an administrator includes any person designated to maintain a network and/or its functions and may include a network security manager, a contracted IT person or a DOD (Department of Defense) security specialist.

In one embodiment of the present invention, the GPA 105 manages the distribution of encryption/decryption keys based on the position of the requesting client and server processing a request. The encryption keys are used to secure the files which may be physically moved from one location to another. These resources or files may reside on a mobile device such as a laptop or a hand-held computer. When files are being accessed on the server from a client, the GPA 105 facilitates the negotiation between the client and server to obtain the correct access tokens used in the encryption of the resource or file. Also, the GPA 105 acts as a relay between the client and server.

This facilitates the decryption of the server file using the server token located on the GPA 105 and the creation of the client token and management entries on the GPA 105 for the client end-point. This will be explained below.

The GPA 105 provides a mechanism for secure transactions and transmission of protected resources, thereby ensuring that the resources are encrypted with keys that can later be obtained by the client to allow viewing. In addition, the GPA 105 facilitates the transfer of files from one endpoint to another using a GPA relay operation. The GPA relay operation allows files to be transferred from a GPA protected server to a GPA protected client. The encrypted file is relayed from the server to the GPA 105 and then to the client. The GPA 105 uses endpoint specific keys to decrypt from the source and encrypt to the destination.

The certificate manager module 205 operates in coordination with the user interface module 200, the policy engine module 210 and the token generator module 215. The certificate manager module 205 functions to manage certificates stored in the keystore database 145. These certificates are used in the encryption/decryption of resources being accessed by clients. The certificate manager module 205 also facilitates the creation of certificates for client encryption/decryption as well as the deletion of certificates that are no longer needed or which have become invalid. Finally, the certificate manager module 205 operates to retrieve or look up certificates that are necessary to complete a request for access to a resource.

The policy engine module 210 operates in conjunction with the user interface module 200, the certificate manager 205, the token generator 215 and the secure position protocol module 220. The policy engine module 210 operates to both create and verify policy when a client requests access to a protected resource from a specific location. The policy engine module 210 manages the persistent storage of the policies in the policy database 140 and maintains the logical mapping from a resource and its security attributes to the certificate that is used as a part of the encryption/decryption keys. Tokens are used to coordinate the association of individual encryption keys with the resource being accessed as discussed below in more detail.

The secure global position protocol module 220 facilitates both the client and server entity. The server entity is available on the GPA 105 and is used by the client to request access to specific resources. The server entity may facilitate both a network client and network server, e.g., file share, ftp server, web server, etc. In one embodiment of the present invention, the server entity is the GPA listening agent to which a client connects. In addition, a client requests access to specific resources and negotiates relay requests using the GPA server entity. The secure position protocol module 220 receives individual requests and uses the security attributes provided by the client to determine if access to a resource is allowed or denied. If access is allowed, a key is provided by the GPA 105 using the secure global position protocol module 220 to communicate with the client. This key is used to decrypt the resource at the client via the GPFS. Thus, the secure position protocol module, in coordination with the audit engine module 225 and the policy engine module 210, manages and responds to client requests and acts as a relay agent for server/client communication.

The audit engine module 225 operates in coordination with the user interface module 200 and the secure position protocol module 220 to log access of protected resources and record, in the audit database 135, user information, source information, i.e., location/device information, a type of access requested, the location of the requestor, as well as the location of the resource and a time stamp. Of course, one of ordinary skill in the art would understand that other audit information might be recorded and the foregoing list is for example only and is neither a limiting nor an exhaustive list.

The token generator module 215 operates in conjunction with the policy engine module 210 and in coordination with the certificate manager module 205 to generate and/or look up client information, location information, policy attributes, user information, resource information and access criteria involved in a transaction involving a resource or file in the GPFS. The token generator module 215 generates the token when necessary and forwards the token to the certificate manager module 205 to access the certificate. If a token has not been created, the token generator module 215 will generate a token for use by the certificate manager module 205 to create and store a certificate for the encryption information.

Tokens are generated by the GPA 105 and are used as a session/table key to provide lookup information for encryption/decryption keys. A token also functions to establish a relationship between a client and a server request when relaying a file or files.

The token is used as a session ID by the GPA client 420, in either a server 115 or remote client 120, 125, and is used by the GPA 105 to reference the session and table information needed to obtain the encryption keys to either resolve a client key lookup for a specific resource or to perform a relay from endpoint to endpoint. The tokens are generated upon authentication using any one of a number of known authentication mechanisms. The token is used to look up a certificate. Certificates are known to those of skill in the art as facilitating the encryption/decryption of files. In the present invention, however, it is not necessary that the certificates be of the type issued by a Certificate Authority (CA) and predefined algorithms can be used to generate keys that can be used to facilitate the encryption/decryption of protected resources. The keys themselves are protected by the GPA 105 in the key database 145 that contains a generated key and/or a reference to a stored certificate.

The GPA 105 is a network component that provides a service to be used by mobile clients and servers. In the present invention, a server may be mobile or stationary but for ease of explanation, a server will usually be considered as stationary. The GPA 105 interacts with clients, servers, and GPA services to determine access policies for a specific instance of a request from a client to a target destination, e.g., a file, although other resources, not just files, may fall under the GPFS in accordance with the present invention. The access policies may be comprised of source information, time information and target information.

The source information can include user identification that is obtained using various authentication methods that are known to one of ordinary skill in the art, e.g., client MAC address, client IP address and geographic location based on GPS information. Time information can include hour/minute in addition to date information.

The target information can include the target server MAC address, the target server IP address, resource information, e.g., file name and/or directory path, information as to whether or not this is a local or remote access request, and the type of access that is being requested. The type of access may include, but is not limited to, read, write, create, open and delete. In addition, the DNS names for the source and destination can also be used as information on which to perform the lookup function. The GPA 105 can be configured to store the DNS names in the policy.

Figure 3:
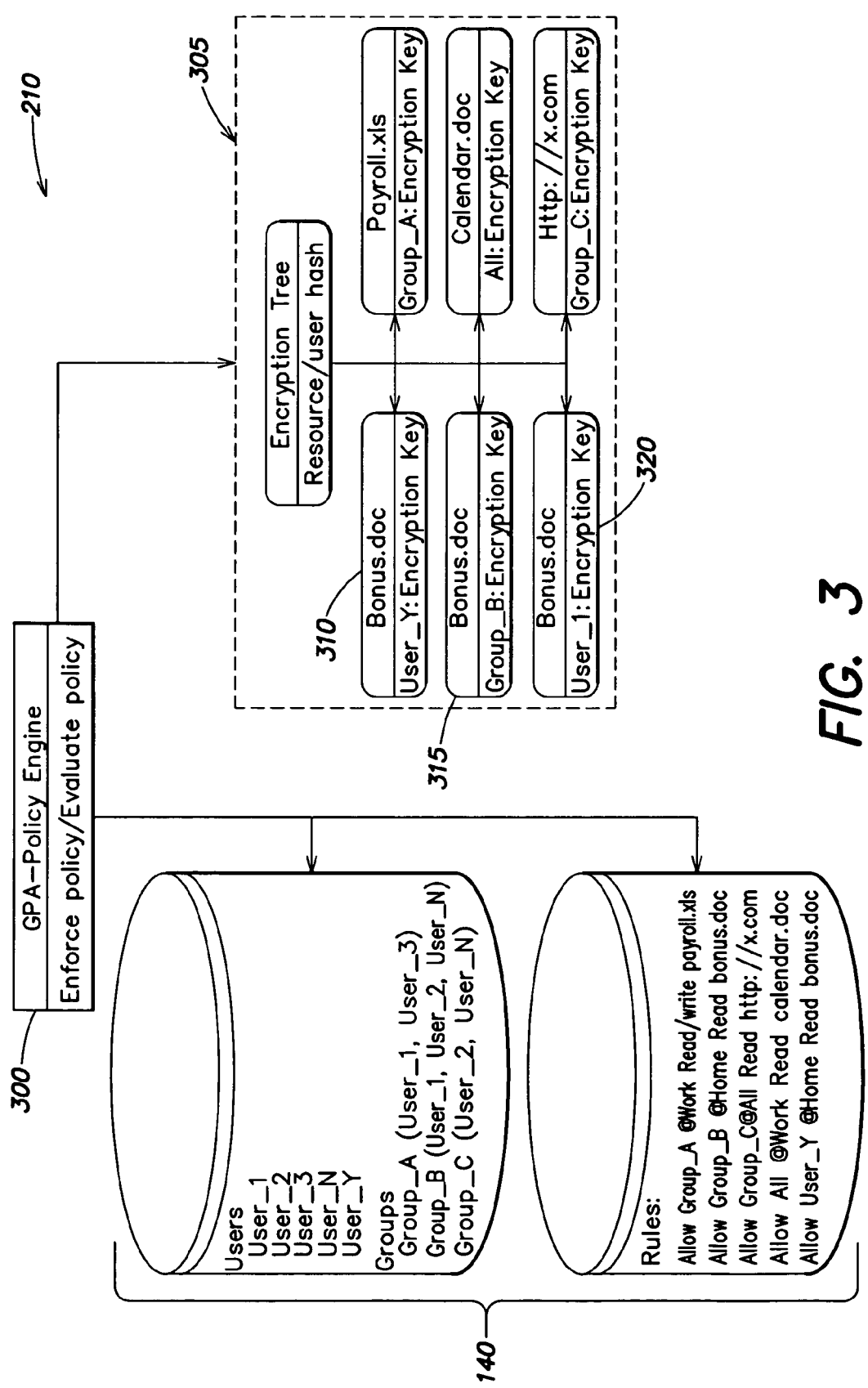
FIG. 3 is a block diagram of a policy engine in accordance with one embodiment of the present invention.

A user's resource access policies are defined by the administrator using the user interface module 200. A user can be defined by the characteristics identified above as to a source. In one embodiment of the present invention, clients and servers may be grouped together and a rule or a set of rules or policies may reference the group. As shown in FIG. 3, the policy engine module 210 includes an enforce/evaluate policy module 300 with access to the policy database 140. As a non-limiting example for explanatory purposes only, a number of users, e.g., User_1, User_2, User_3, are defined. Further, groups of users are defined where, for example, Group_A includes User_1 and User_3 and Group B includes User_1, User_2 and User_N. A set of rules would be created to define an access policy either by user or by group. As shown in FIG. 3, a number of rules would be created to define an access policy for a particular group. In addition, specific rules may apply to a specific user. As an example, a rule may be used to determine whether the user has access to a local file resource in a specific data store directory during normal working hours on weekdays.

An encryption tree 305 is used to represent, for the sake of description, how encryption keys are used to protect a resource. It should be noted that the use of the encryption tree construct is merely for explanatory purposes only and is not intended to limit the present invention to such an embodiment or data structure. The encryption keys are stored in the keystore database 145 under the control of the certificate management module 205.

As shown in FIG. 3, for security reasons, multiple encryption keys may be used to protect the same resource. As an example, the document Bonus.doc would have a first entry 320 that has an encryption key for User_1. In addition, the same document would have another entry 315 in the encryption tree 305 that represents a Group_B encryption key. In one embodiment of the present invention, the system protects against an encrypted file being moved from one computer to another without the intervention of the GPA 105 in what might be an attempt to defeat the GPFS. In other words, the assumption that the encryption key remains the same is not true. The present invention prevents such an attempt to bypass the security functions of the GPA 105 by associating an encryption key with user policy and location information. As an example, with respect to FIG. 3, manually copying the Bonus.doc file from a Group B computer to the User_1 computer will not result in the correct encryption keys required to decrypt and read the file on the destination computer because the encryption key for a protected resource is located by using a hash of the target resource and user or group.

In accordance with one embodiment of the present invention, however, where the user is a member of a group with no individual encryption keys for the resource, and the resource is mirrored when copied to match the exact location as the source, a GPA lookup with the correct result is possible.

In the foregoing, User_1 has her own encryption key 320 for Bonus.doc even though User_1 is a member of Group_B which has access to the same document. There may be instances where a member of a group has a policy applied that differs from, or is in addition to, the policy for the group. As a non-limiting example, it may be the situation where User_1 travels more often than most other users in Group_B and, therefore, needs to have a different policy established. As all access to the document Bonus.doc is through the GPA 105 and is based on the user and target resource hash, an entry in the encryption tree 305 must be made. It should be noted that while the foregoing was with respect to a file, Bonus.doc, the present invention is not limited to just protecting access to a file but also to other resources including, but not limited to, a file directory, removable media, and non-removable media such as a hard drive.

In one embodiment of the present invention, group associations take precedence over user definitions in the key lookup table to allow for group sharing of files when manually copying these files from a computer listed, for example, in Group_B, to another computer in the same group. Thus, in the present invention, the manual copying of a file does not guarantee that the correct encryption keys have been mapped as the GPA 105 should always be used to provide the correct encryption/decryption key mapping to secure the resource and, therefore, direct copying is not a mechanism by which the security features of the present invention can be circumvented.

The branch order of the encryption tree 305 is configurable by the administrator. The administrator can set a tree lookup policy that requires the user token to always be used if available in order to provide better security. Such a configuration would disallow a file being copied from one group member to another with subsequent access to the file being attainable without intervention of the GPA 105

The GPA 105 provides for position dependent access management of secured files. The GPA 105 manages the encryption of a file in both local environments, i.e., client-based access, and remote operations, i.e., client/server based accesses. With respect to remote operations, the GPA 105 manages the decryption of a file from one data store in the server to an encrypted format at a destination data store located on a client.

Figure 4:
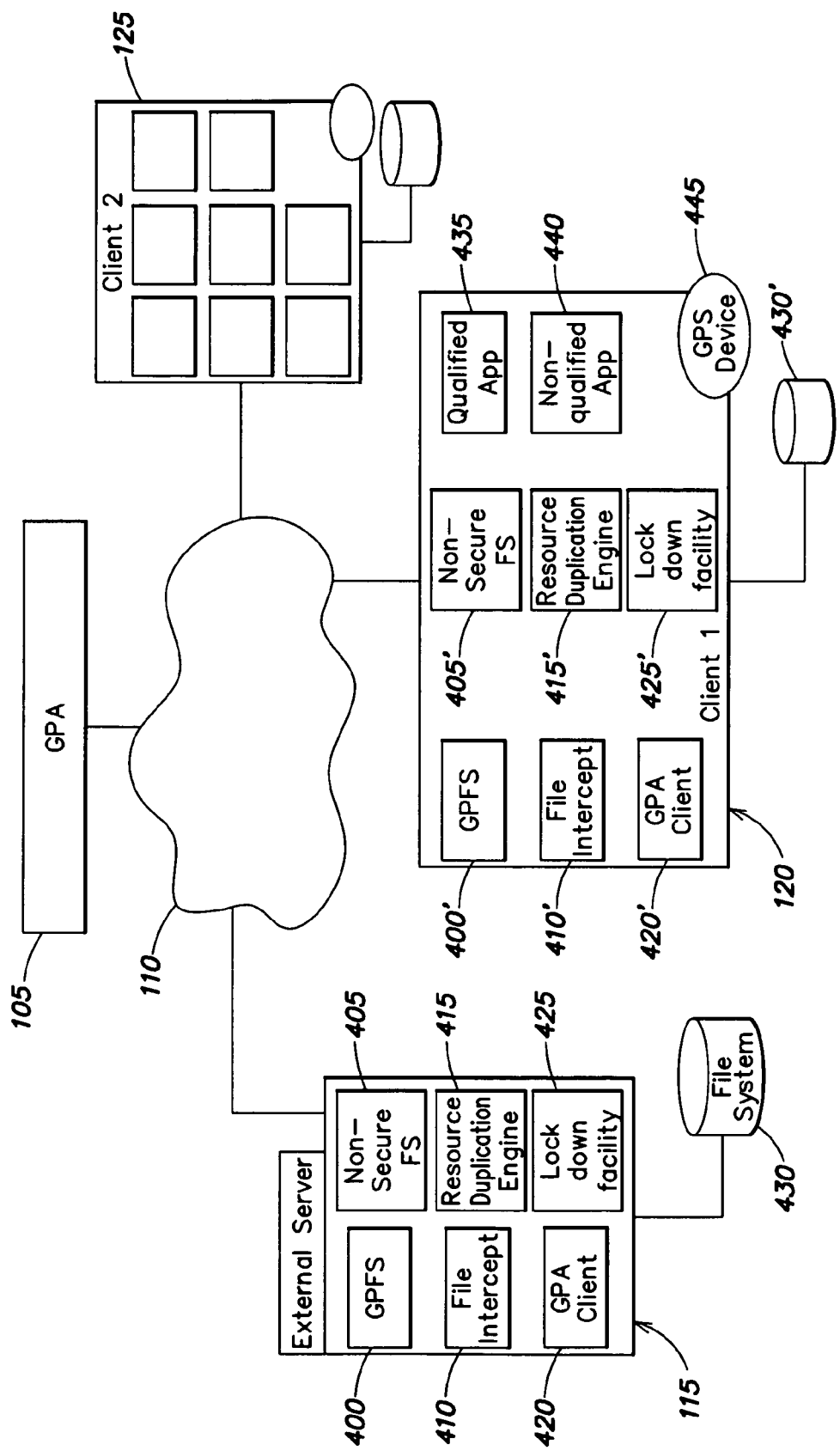
FIG. 4 is an expanded block diagram of the system of FIG. 1.

As shown in FIG. 4, a server 115 can include a GPFS module 400, a non-secure file system module 405, a file intercept module 410, a resource duplication engine module 415, a GPA client 420 and a lock-down facility module 425. The server 115 is also connected to a file system 430.

A first client 120 includes an instance of each of the modules as described above with respect to the server 115, in addition to having a qualified application module 435 and a non-qualified applications module 440. In one embodiment of the present invention, the client 120 also includes a Global Positioning System (GPS) device 445. An alternate embodiment of the present invention would provide a GPS device 445 in the server 115. In many instances, however, the server 115 location is not variable and thus its location is assured. In one embodiment of the present invention, the location of the server is determined in order to validate the server and prevent address spoofing. Any one of a number of known defenses to address spoofing can be implemented.

The GPS device 445 operates to determine its position by receiving signals from satellites in orbit around the earth. Any one of a number of known devices can be used to provide this information. In addition, as is known by one of ordinary skill in the art, the position information can be secured such that false position information is not provided to the GPA 105.

The operation of the modules in the server and client will be discussed in more detail below. The Global Position File System allows an administrator to protect resources by using encryption methods to ensure that sensitive resources located on a mobile device cannot be compromised. The GPFS uses a set-up utility to define which GPA 105 will be used in the coordination of the transfer and access operations of protected resources on the local systems.

The GPA 105 can also be the defined gateway and a multicast message may be used to both advertise the GPA server or lookup (client) to locate the GPA service. If IPv6 is being used, the advertisement can be a header extension using address/service discovery.

Figure 5:
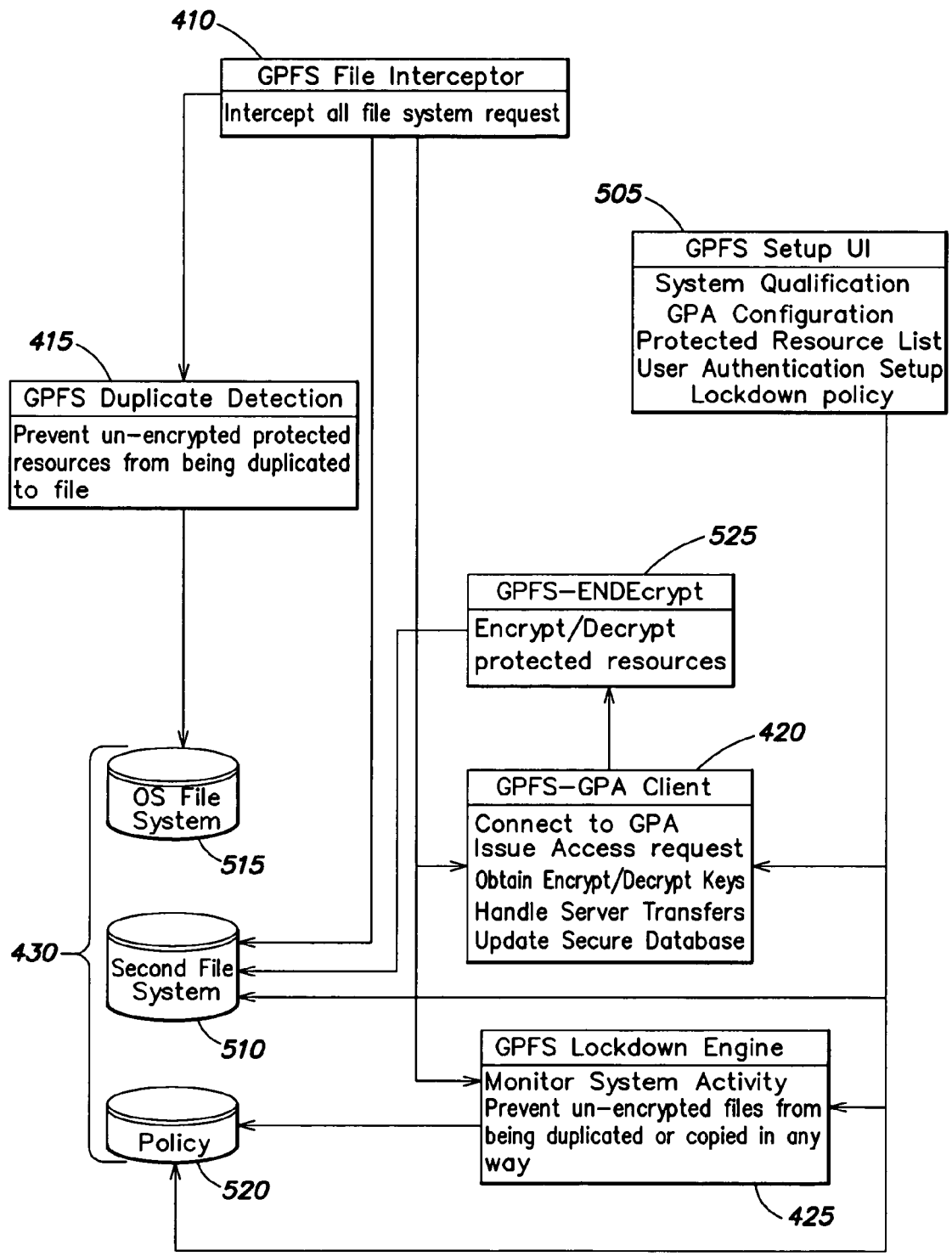
FIG. 5 is a block diagram of components of a Global Positioning File System in accordance with one embodiment of the present invention.

As shown in FIG. 5, a GPFS set-up user interface module 505 operates in coordination with the GPA client module 420 and the GPFS lockdown engine module 425 on the client system. As shown in FIG. 5, the file system 430 includes a secured file system portion 510, an unsecured file system portion 515 and a policy storage portion 520. As would be apparent to one of ordinary skill in the art, the file system 515, secured file system 510 and policy portion 520 may be distributed across a number of different storage devices to provide for either increased security or reliability features.

By operation of the GPFS set up user interface module 505, the administrator can qualify the system for GPFS operation and configure information with respect to the GPA 105 that will be used. This information, with respect to the GPA 105, may include its address, connection protocol and other information necessary to establish connection to the GPA 105. Further, the administrator may define the protected resources and set up user authentication information, for example, username and password. The username and password management can be the same as that used by the security gateway or, alternately, it may be a separately associated service. Finally, a lock-down policy, that will be discussed in more detail below, can also be administered.

The GPFS file interceptor module 410 is used to monitor all file accesses on the client device. Upon each file system request, the interceptor module 410 receives the request and determines if the request is for a protected resource or is directed to the unprotected file system. Access to a file not protected by GPFS is directly routed to the Operating System (OS) for processing. If the file request is for a protected resource, then a connection to the GPA 105 is created and a request for access to the resource is sent. This request includes both source and target information. As above, based on the response from the GPA 105, a token may be returned that is used in the decryption of the resource to allow viewing and, if requested and allowed, modification. The file interceptor module 410 operates in coordination with the GPA client module 420, the GPFS duplicate detection module 415 and the GPFS lockdown engine 425.

The GPA client module 420 is configured as a result of the operation by the administrator of the set-up user interface module 505. The GPA client module 420 operates to connect to the GPA 105 in response to a request that has been intercepted by the file interceptor module 410. The GPA client module 420 issues the access request and obtains the encryption/decryption keys when the GPA allows access. Further, the GPA client module 420 handles server transfers and also updates the secure database.

A GPFS encryption/decryption module 525 operates in conjunction with the GPA client module 420 and functions to encrypt or decrypt the protected resources as directed by the GPA client module 420. The encryption/decryption module 525 accesses the secured file system 510. The GPFS duplicate detection module 415 operates to prevent unencrypted protected resources from being duplicated to a nonprotected portion of the file system 430. The duplicate detection module 415 restricts the ability for an unqualified application, i.e., an application that has no knowledge of the security implications of the resource, from making a copy of a protected file while that resource or file is decrypted. To restrict this ability, the file interceptor module 410 may be configured to disallow any file I/O operations targeted to the unprotected file system. Further, the duplicate detection module 415 can include a duplicate detection signature engine that is used to monitor file operations to and from the unprotected file system and allows for persistent storage only after verifying that no sensitive information is being saved. Additionally, policies for removable media can be defined. In one embodiment, removable media must contain a secure directory that contains the information needed to resolve the policies for the protected files.

According to one embodiment of the present invention, measures are implemented to ensure that the resource cannot be duplicated in any way when an encrypted file is decrypted and used in an unqualified application, i.e., a third party application that does not take into account the security implications of the resource being reviewed. In one mode of operation, the "Save As" option available on most applications, is monitored. To prevent the duplication of sensitive information, the duplicate detection module 415 monitors the basic stream of normal file input/output processing. The duplicate detection module 415 contains the references to the sensitive information that have been opened for viewing, i.e., decrypted, and ensures that this information is not being stored in any other file, media or location not protected by the GPFS. The duplicate detection module 415 monitors all file activity and uses data signatures to determine when a protected resource is in the process of being saved to unprotected storage. Any attempts to perform unauthorized operations on a protected resource result in a "File I/O Error" being returned.

While the duplicate detection module 415 operates to ensure that protected data is not stored in an unprotected mode, but allows for storage of nonprotected or nonsecured files, the lock-down module 425 functions to monitor system activity by monitoring the "cut and paste" buffers and network accesses of the system whenever sensitive files have been opened in order to prevent any duplication using these methods.

In accordance with operation of one embodiment of the present invention, any access to a protected file is managed using access requests sent to the GPA 105. Such standard operations as open, read and write are managed by the GPFS/GPA via a secure position protocol. In addition, a user may be allowed to create new files, modify and save files or copy files from one filename to another in the protected directory data store of the GPFS. As has been described above, these operations are controlled by GPA policies and the GPFS uses the secure position protocol to obtain the encryption key that must be used to save a file if policy allows.

In one embodiment of the present invention, where high security is required, the communication between the GPFS and GPA 105 can be configured to disallow client encryption. In this embodiment, the encrypted file is required to be sent to the GPA 105 for encryption using a new key and relayed back to the client before being stored on the local system in the protected data store.

Figure 6:
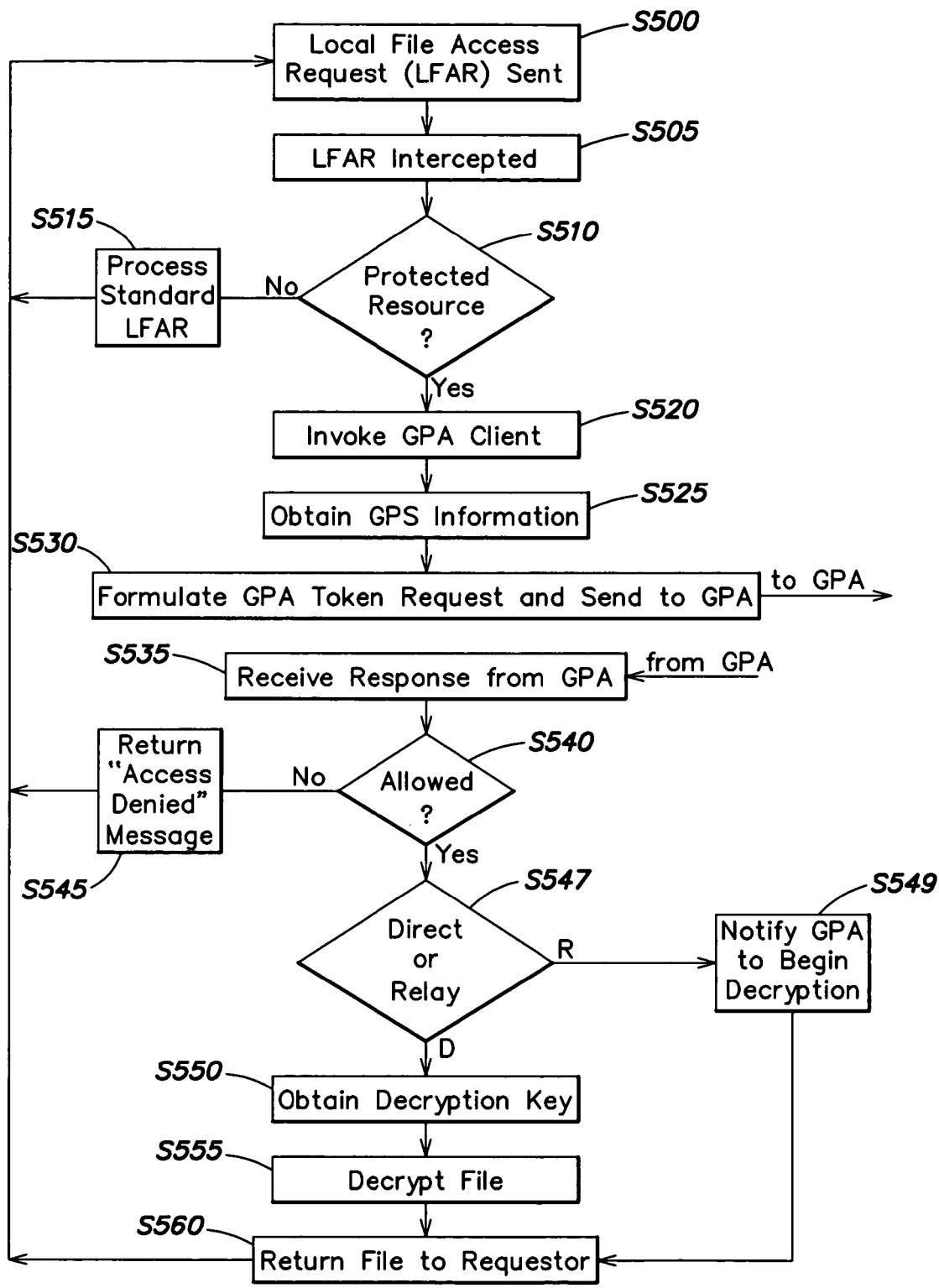
FIG. 6 is a flowchart representing a method of access in accordance with one embodiment of the present invention.

An overview of operation of the GPFS will now be described in conjunction with the flowchart of FIG. 6. The process described with respect to the flow chart in FIG. 6 is a client-based access. A local file access request (LFAR) is sent at step S500 and the LFAR is intercepted at step S505 by operation of the file interceptor module 410. A determination is made at step S510 as to whether or not the resource or file that is the subject of the access request is protected or not. If the resource is not protected, then control passes to step S515 where the standard OS access is processed. In one embodiment, the operation requires the transmission to take place over an SSL connection or a secure VPN connection. The GPA 105 enforces the security connection requirements.

Returning to step S510, if it is a protected resource, control passes to step S520 where the GPA client is invoked. GPS information is obtained at step S525 to identify the geographic location of the requesting client. The GPA token request is formulated and sent to the GPA at step S530.

A response is received from the GPA 105 at step S535 and at step S540 it is determined as to whether or not the GPA 105 has allowed the access. If access is not allowed, then control passes to step S545 and an "Access Denied," or something similar, message is returned.

Returning to step S540, if the access is allowed, then at step S547 it is determined if this is a "direct" or "relay" access. Here, a direct access is one where the local device has the capacity to decrypt the file. If this is a direct access, control passes to step S550 and the decryption key is obtained from the response that was received from the GPA 105 and at step S555 the file is decrypted and the decrypted file is returned to the requestor for processing at step S560.

Returning to step S547, if the access is not direct, then it must be a "relay" access where the file is decrypted by the GPA 105 due to the security settings for the file. Thus, at step S549, the GPA 105 is notified to begin decryption of the file, a stream is opened and the decrypted file is returned to the requester at step S560. Details of the stream will be discussed below.

Figure 7:
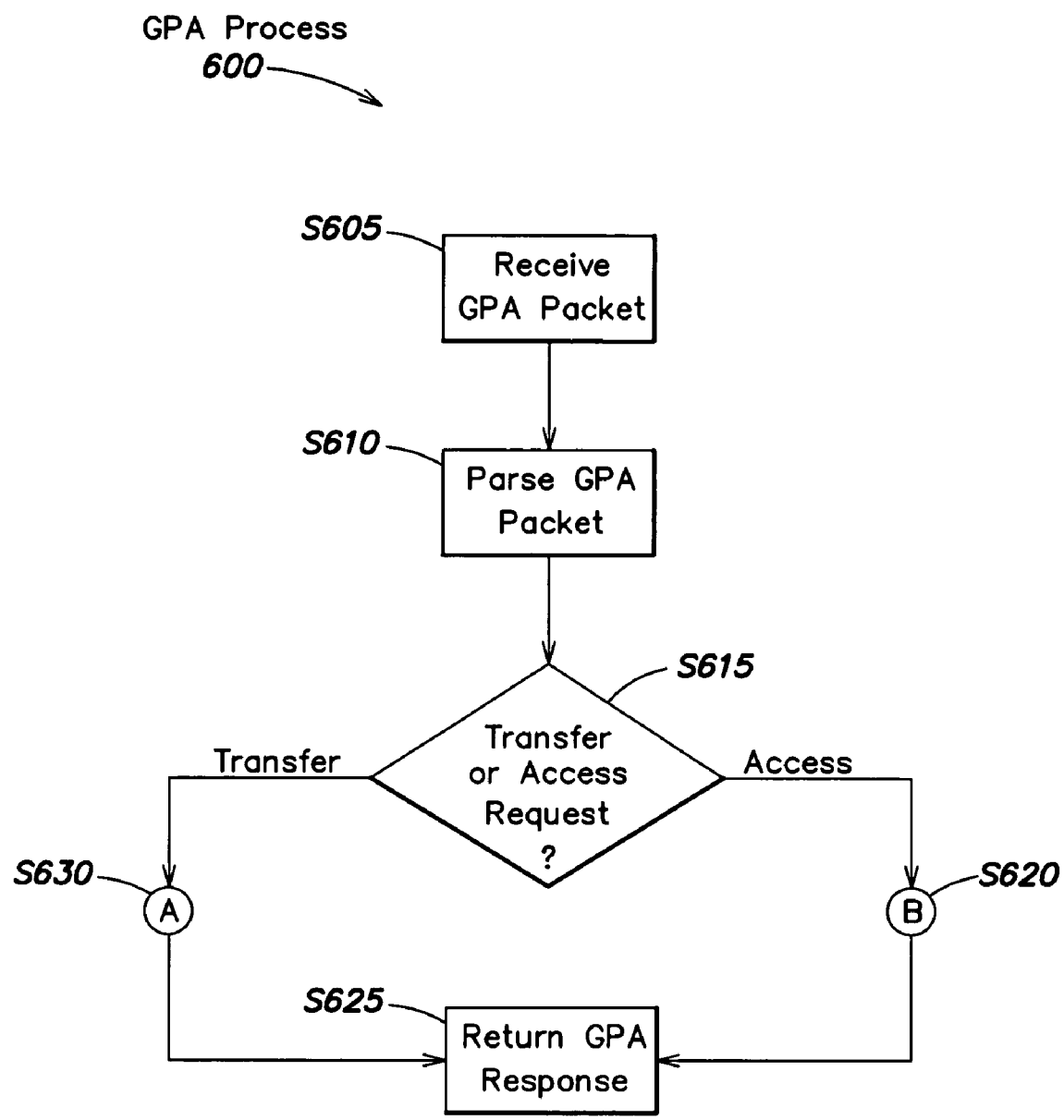
FIG. 7 is a representation of a GPA process.

At the GPA 105, upon receipt of a GPA token request, the GPA 105 implements a process 600 as shown in FIG. 7. The GPA packet is received at step S605 and subsequently the GPA 105 parses the packet at step S610. A determination is made, step S615, as to whether or not this is a transfer or access request.

Figure 8:
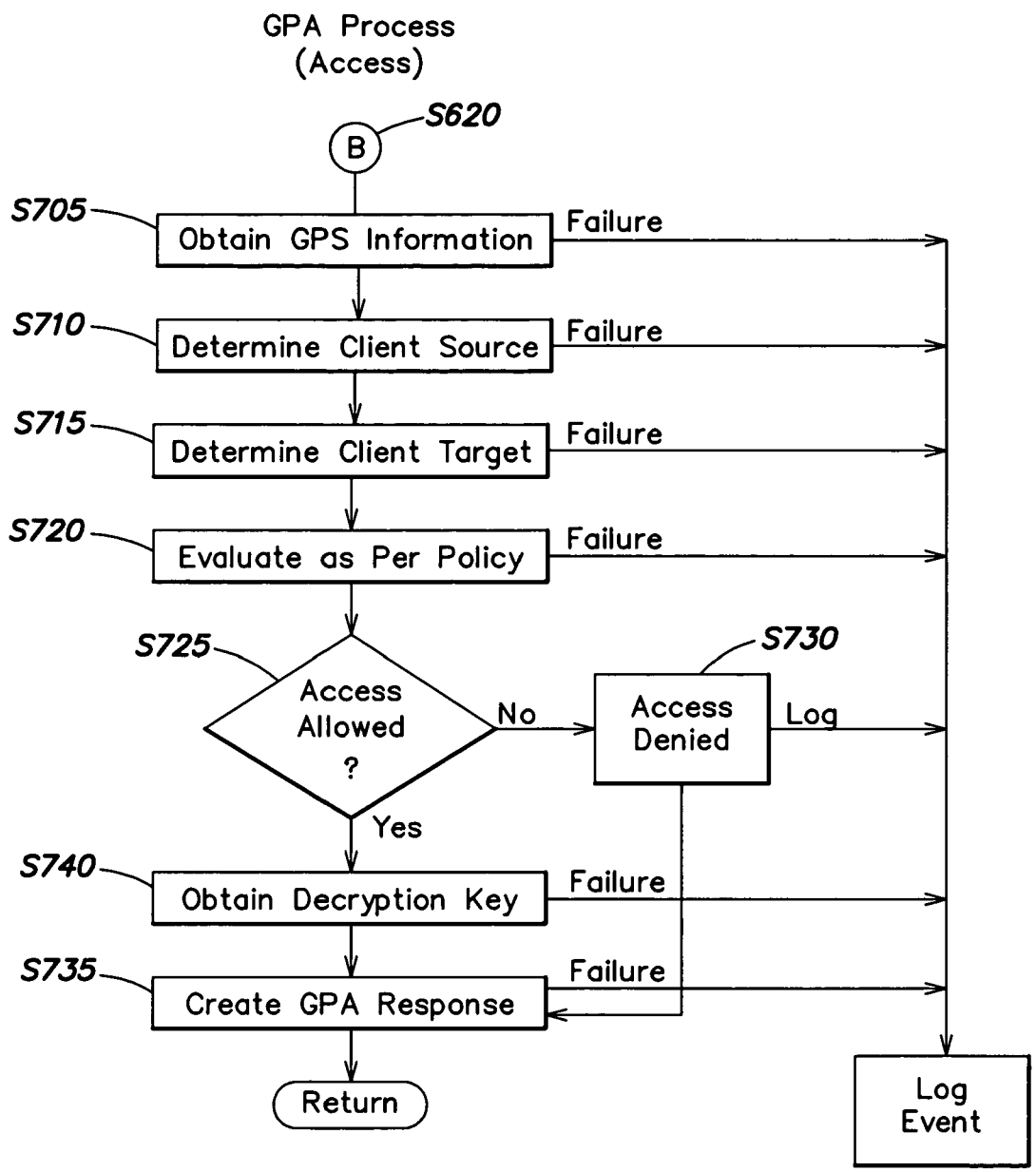
FIG. 8 is a flowchart representing an access request and GPA process.

If it is determined that it is an access request, then control passes to step S620. As shown in FIG. 8, at step S705, GPS information is obtained from the GPA packet and a determination, step S710, is made as to the client source and at step S715 the client target is determined. This information is evaluated as per the policy at step S720 and a determination is made at step S725 as to whether or not access will be allowed. If access is not allowed, control passes to step S730 and "Access Denied" is returned and a GPA response is created at step S735 and returned as part of a GPA response at step S625, as shown in FIG. 7.

Returning to step S725, if access is allowed, control passes to step S740 where the decryption key is obtained and a GPA response is created at step S735 and the appropriate GPA response is returned at step S625.

Figure 9:
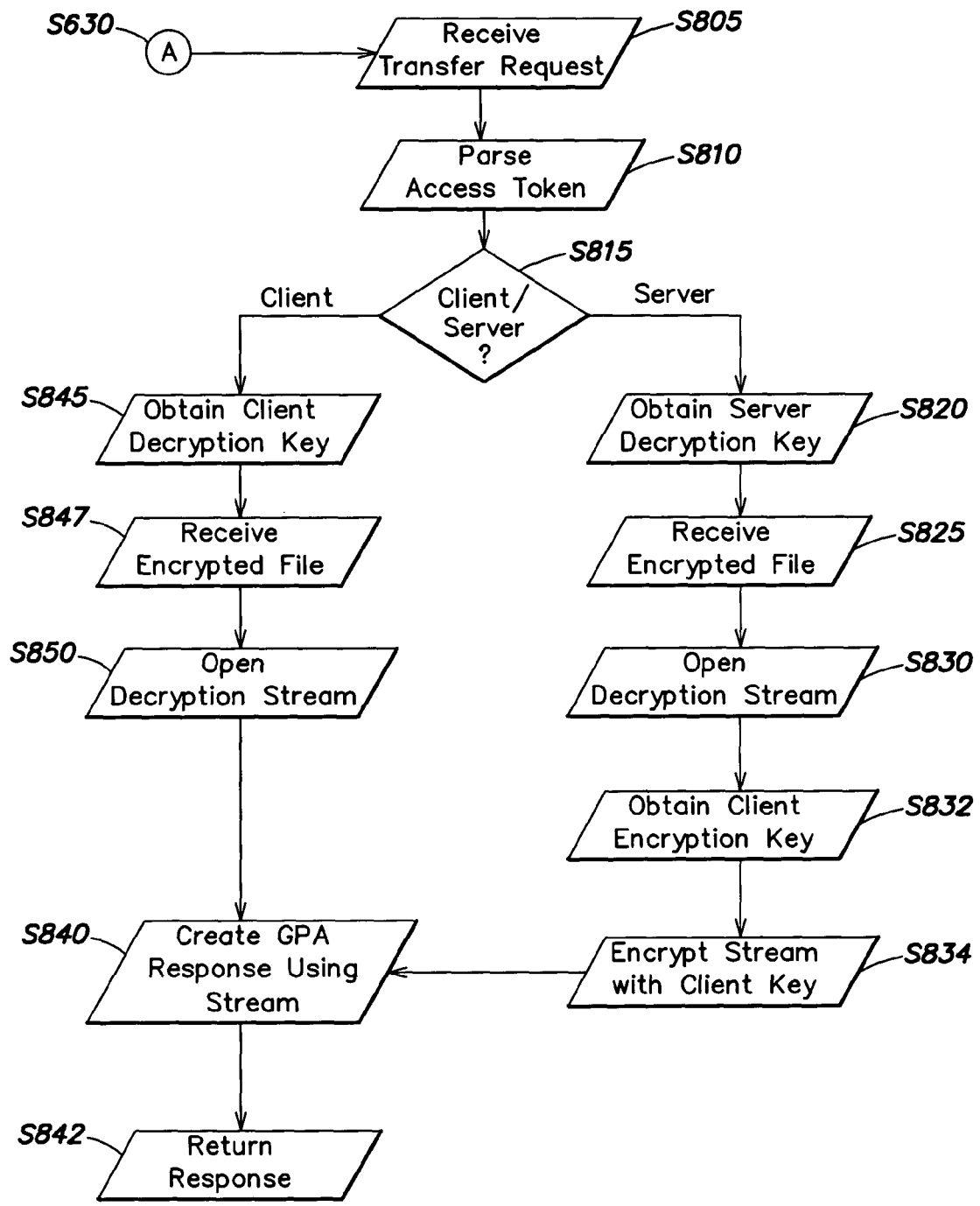
FIG. 9 is a flowchart representing a transfer request within a GPA process.

Now returning to step S615, as shown in FIG. 7, if it is determined that it is a transfer request, the control passes to step S630 and picks up at step S805 in FIG. 9 where the transfer request is received. At step S810, the access token is parsed and a determination is made at step S815 as to whether or not the target resource is located on a client or a server.

If it is determined that the resource is on a server, then control passes to step S820 where a server decryption key is obtained and at step S825, the encrypted file is received. Subsequently, a decryption stream is opened at step S830. The client encryption key is obtained, step S832, and the decrypted stream is encrypted with the client key, step S834. This encrypted stream is received as input at step S840 and a GPA response is created. A stream is a network data representation of a file where the file is read from file to memory and from memory to a network socket. The binary data is the stream. In TCP, this concept is defined as the data stream. A GPA response is created, step S840, that includes the encrypted input and returned, step S842, to the operation at step S625 in FIG. 7.

In one embodiment, the client can be configured to use only the relay mode. In such an instance, the policy is defined to allow the GPA 105 to encrypt/decrypt files, the relay uses a token to define the keys and stream the file to the GPA 105 which would decrypt the file and send the file back to the client over a secure SSL connection.

At step S815, if it is determined that the resource is located at a client, then control passes to step S845 where the client decryption key is obtained, the encrypted file is received, step S847, and a decryption stream is opened, step S850. The file is received as streamed input at step S840 and a GPA response is created and the response returned, step S842. It should be noted that the operation at step S840 streams whatever is received as input, either the encrypted stream from the server or the decrypted stream from the client.

As above, the GPA 105 operates to relay a data stream from a file share to the GPA 105 and then to a client that is requesting the downloading of the file. A "file share" is a service that makes a resource available over a network, e.g., a Windows file share, a web service or an ftp server. As an example, the client requests an open operation on a protected resource on a remote server. The file intercept 410 on the client makes an access request to the GPA 105 to determine if the resource is protected. The GPA 105 either responds with a "NO" indicating that the resource is not protected and a normal OS access is performed or the response is "YES." If it is the latter, the GPA 105 responds with a token used to identify the request from the client to the server for a protected/encrypted file. The open request is then made to the server and the server performs the same operation as the client. The GPA 105 is contacted and the GPA 105 determines if the server's request is allowed. If allowed, another token is generated and associated with the client token. The client receives the encrypted file from the file server and then relays the file to the GPA 105 using the token obtained on the access request The file server relays the encrypted file to the GPA 105, the GPA 105 decrypts the file using the server key, encrypts it using the client key and relays it to the client. This method is a faster solution and does not expose the server keys to the client. The GPA 105 uses the token to look up the server decryption keys for the file, decrypts the file, encrypts the file using the client key and returns the result using a stream. The file is received by the client interceptor and stored on local disk in a protected directory. The keys and associations are defined and maintained on the GPA 105 to be used when the client tries to access the file.

Remote resource access, in accordance with one embodiment of the present invention, will be described with reference to the block diagram of FIG. 14. A remote resource access occurs when a client 120 requests access to a resource, e.g., a file located on a server 115, where the file is under the control of the GPFS of the present invention. The client 120, server 115 and the GPA 105 interact with one another to control the secured access of the resource by the requesting client 120.

Figure 14:
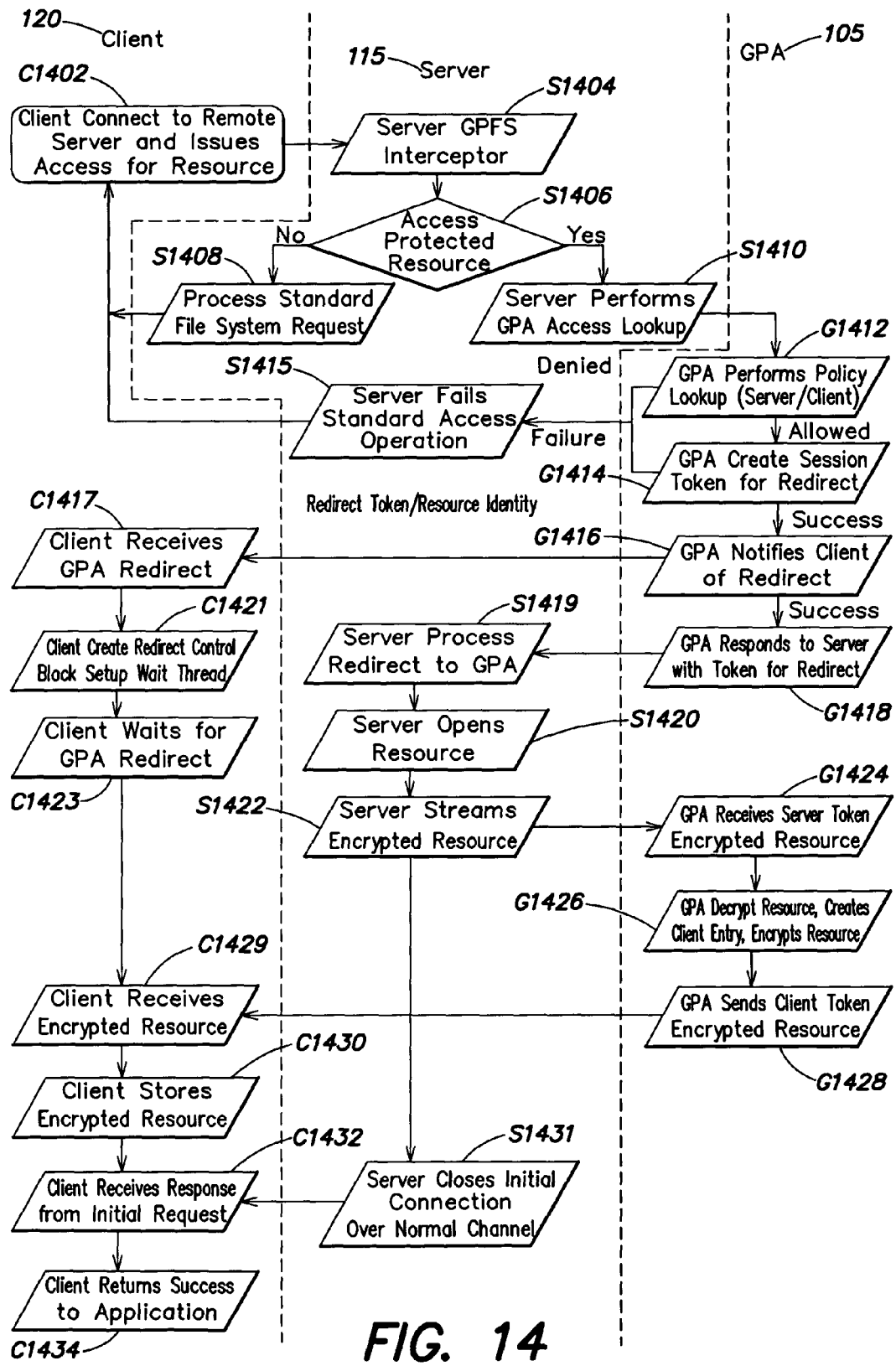
FIG. 14 is a block diagram of the remote resource access process in accordance with one embodiment of the present invention.

As shown in FIG. 14, for ease of explanation, the operations of the client 120, references with a "C" prefix, are organized in the left-most column, as defined by the vertical dotted lines, the operations of the server 115, references with an "S" prefix, are found in the center column, and the operations of the GPA 105, references with a "G" prefix, are found in the right-most column. No structural limitations to the present invention, however, are implied by the organization of this diagram.

As an overview, when the client 120, e.g., ftp, browser or application, seeking to access a resource, attempts to access a remote resource protected with the GPFS, the server's access will be intercepted and the request will be evaluated to determine if it is referencing a secured directory or resource protected by the GPA 105. If the resource is not protected, the request follows the normal OS processing and the results are returned to the client. If the request is for a protected resource, when the server issues the GPA lookup, the GPA 105 will respond with the result. If the request is denied because of policy, the server, via the GPFS, will obtain the GPA response and convert it to a file system response back to the requesting server application, which will in turn respond to the initial client request with the correct, mapped result.

The relay operation will now be described in more detail with reference to FIG. 14. Initially, C1402, the client 120 connects to the server 115 and requests access to a resource located therein. A server GPFS interceptor function intercepts, S1404, the request and determines, S1406, whether or not the request is for access to a protected resource. If the access is not protected, control passes to the standard OS request response, S1408, and the resource is returned to the client 120 from the server 115.

If the resource is protected by the GPFS, the server 115 performs a GPA access lookup, S1410, that is received by the GPA 105. The GPA 105 performs a policy lookup (server/client) in response to the GPA access from the server 115, G1412. If the GPA 105 determines that the access is not allowed, the server is notified of the denial and the server notifies, S1415, the client 120. The access validation is determined using the client (source) and server (destination) policy. The server validation lookup to the GPA 105 includes all the required fields to include resource, access type and time (as related to the server). The GPA 105 determines if the client has access to the server and its resource based on the information of both the client and server.

In one embodiment, it is possible that the server has no access to the resources it contains and only clients have access. For security reasons, a policy can be defined to only allow access from specific clients and disallow access from the server. In this case, a server key is created to encrypt the file on the server, but there is no rule which allows the decryption by the server. The key is used solely to provide the relay from the server to the GPA for decryption before encrypting it with the client key to relay to the client.

If the access is allowed, the GPA 105 creates a session token for the redirection of the client request, G1414. If the operation is allowed, the GPA will create a session ID and associate the server encryption key with an input stream and create a new client encryption key and store it in the policy engine, this key will be used for the output stream. Subsequently, G1416, the GPA 105 notifies the client 120 of the redirection of the request and passes the redirect token/resource identity information to the client 120. Included in the redirect notification is the server and resource the client attempted to access. The client receives the GPA redirect information, C1417, and initiates a redirect control block setup/wait thread, C1421, and waits for the GPA redirect, C1423.

Subsequent to the GPA 105 successfully notifying the client 120 of the redirection of the request, the GPA 105 responds to the server 115 with the token for redirection, G1418. The server 115 process the redirection from the GPA 105, S1419 and opens the resource, S1420. The server 115 streams the encrypted resource, S1422, to the GPA 105. The server will obtain the client requested resource and stream the contents to the GPA using the relay session ID. Once the resource has been sent to the GPA 105, and after the client receives and acknowledges that the resource has been received by the GPA 105, the GPA 105 returns a status block to the server and the server maps the response to a successful system request. This response is then returned through the file system to the server application. The server application then closes the initial connection with the client 120 over the normal channel protocol used (HTTP, FTP, file service etc)., S1431.

The GPA 105 receives, G1424, the server token encrypted resource from the server 115. The GPA 105 decrypts the received resource, creates an entry associated with the requesting client, and encrypts the resource, G1426. The contents are decrypted at the GPA using the server key and encrypted using the client key and sent to the client. The GPA 105 sends, G1428, the client token encrypted resource to the client 120.

The client 120 receives, C1329, and stores, C1430, the encrypted resource. Once the transmission of the resource is completed, the GPA closes the relay stream with the client and server. The server 105 then responds to the client that a successful transfer was completed using the normal protocols defined by the accessing protocol. The client receives the response from the server and maps it to the redirection status to conclude the transaction. The client 120 receives, C1432, a response from the initial request from the server 115 upon the server's completion of sending the resource to the GPA 105, referring to S1431 above.

The closing of the initial connection is coordinated with the client's receipt/storing of the resource. The client/server request (HTTP, FTP, file share etc) is blocked while waiting for the GPA 105 to send status back. Status is not returned until the client receives the resource and acknowledges its reception. During this period, the client application is blocked by the initial server request. Once the client signals that the relay is complete via the GPFS to the GPA 105, the GPA 105 returns a successful status code to the server. The server maps this status code to a successful file system response on the server, which is returned to the server application. The server application sends this response to the client over the pre-established protocol channel and the hand-shake is complete. The client, once the resource has been received, returns an indication to the requesting application that the request has been successfully completed, C1434.

The following is a non-limiting example of access and transfer of a protected file according to an embodiment of the present invention. For explanatory purposes only, referring to FIGS. 1 and 3, assume that User_Y is on client device 120, e.g., a laptop computer, and the document Bonus.doc is stored according to the GPFS of the present invention on the device 120. Thus, document Bonus.doc is stored and encrypted with the User_Y encryption key 310 located in the encryption tree 305.

If User_Y is at home and desires to look at the document Bonus.doc, User_Y will turn on her device 120 and access the document, e.g., through a word processing application such as Microsoft Word, which will make an operating system call for the document. This call will be intercepted by the file interceptor module 410 which will identify it as an access request for a protected document. As a result of this determination, the GPA client 420 will be invoked and a GPA request is sent to the GPA 105.

The GPA 105 receives the request and determines whether User_Y can access Bonus.doc from home or some area defined as "home," according to the GPS information. The "boundaries" of a defined geographic area, e.g., "home" can be set by the administrator when the policies are defined. Thus, the definition of "home" could be as specific as only within the property lines defining the property or broadly defined as being within a "home" city or state.

As shown in the policy store 140, User_Y can access Bonus.doc from home, as defined by the GPS information in the GPA request, so the User_Y encryption key 310 for Bonus.doc is returned. The key 310 is identified by applying a hash function to the resource and user information. One of ordinary skill in the art will understand that any number of hash algorithms may be implemented. The key 310 is used to decrypt the document and it opens up in the word processing application.

In another example, assume User_1, a member of Group_B, is at her home working on the second client device 125 and wants to transfer the document Bonus.doc on the device 120 of User_Y to her device 125. This request would be identified as one for a protected file and handled by the GPA client 420 on each of the first and the second devices 120, 125. The GPA 105 would check the policy 140 and see that because User_1 is in Group_B access is allowed.

According to the present invention, however, a Group_B encryption key 315 will be used for Group_B devices that is different than the User_Y encryption key 310 even though it is for the same document Bonus.doc. The GPA 105 will retrieve the document Bonus.doc from the first client 120, decrypt it, encrypt it with the Group_B encryption key 315 and send it to the second client device 125 along with the Group_B encryption key 315 that the GPA client 420 on the second device 125 will then use for accessing the file.

The same document, Bonus.doc, will be encrypted with a key that is a function of the characteristics of the device, for example, its location and its user. The manual copying of the file from, for example, the second client device 125 to the third client device 130 will not defeat the protection scheme of the present invention as there will be no entry for the resource/user hash result for that document in the encryption tree 305.

Figure 10:
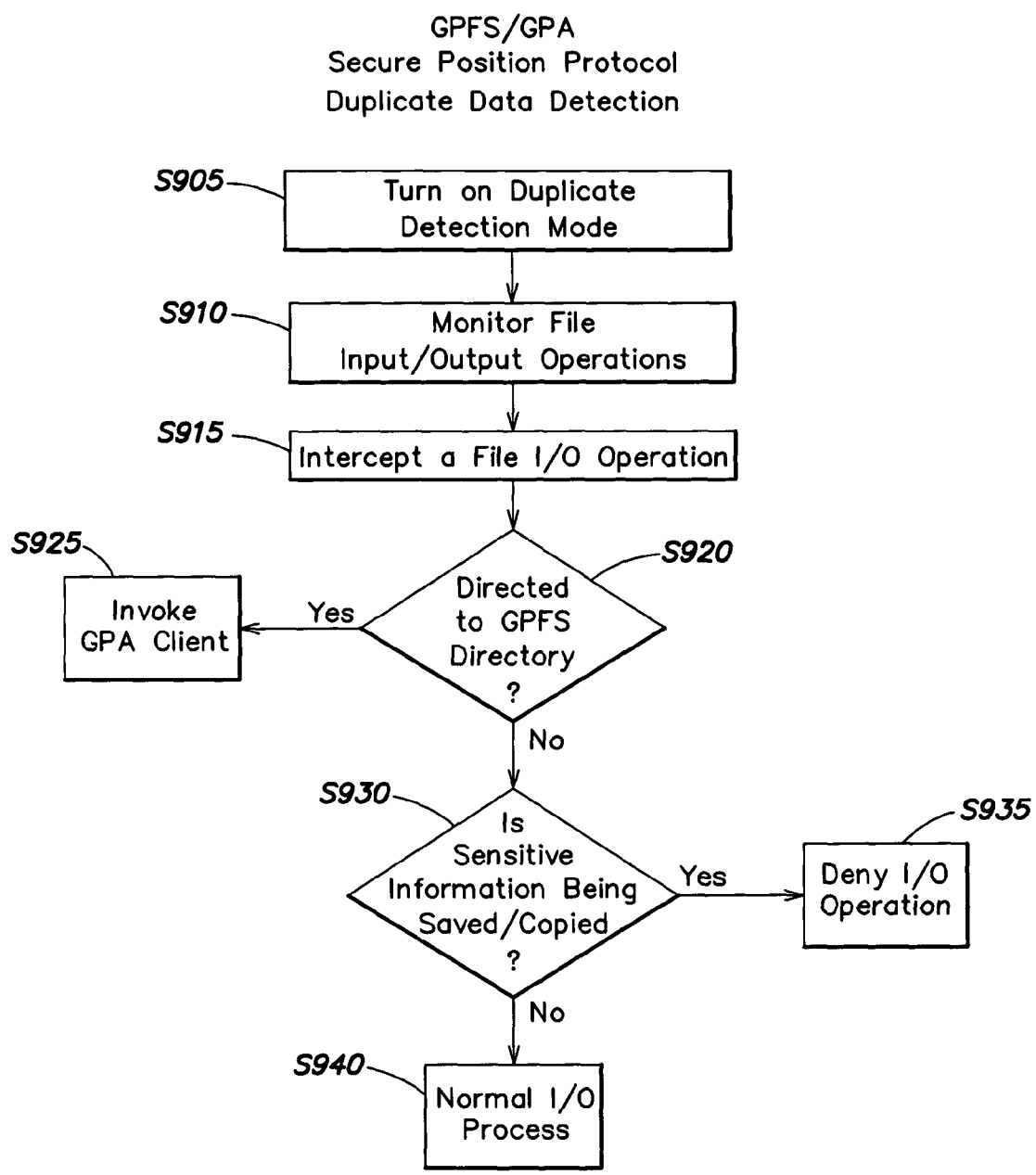
FIG. 10 is a representation of the secure position protocol and duplicate data detection operation in accordance with one embodiment of the present invention.

When operating in duplicate detection mode, step S905, as shown in FIG. 10, all file Input/Output operations are monitored in step S910 and a file I/O operation is intercepted at step S915. If it is determined, at step S920, that the operation is directed to a secure or GPFS directory, then at step S925, the GPA client is invoked and operation proceeds as has been described above. Alternatively, if the operation is not directed to a GPFS directory, then control passes to step S930 where it is determined if sensitive information is being saved and/or copied. If this is determined to be the case, then control passes to step S935 where the I/O operation is denied. Alternatively, control passes to step S940 and the normal I/O process is invoked. The foregoing operation would be the same if the lock-down feature has been turned on.

The secure global position access and transfer protocol is used to facilitate access requests for protected services and/or resources by a mobile client using a stateless or a stateful protocol. The protocol defines a mechanism to manage the transactions for both the access and transfer of encrypted resources based on position. This protocol provides the mechanism for two specific actions, i.e., the controlled access of resources based on position and the transferring of a protected resource from one system to another using encryption tokens negotiated using the GPA 105 based on location and access rights. The flow of control to gain the encryption keys used for the access of information is provided by either a stateful mechanism or a stateless mechanism.

Figure 11:
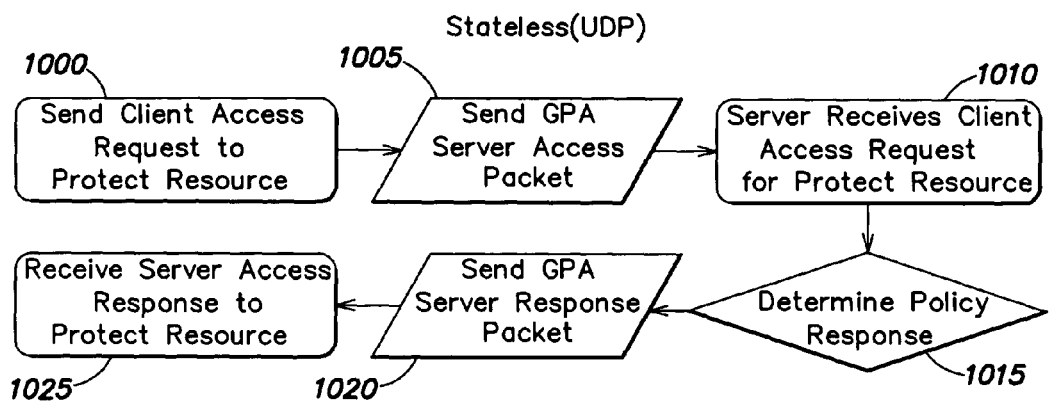
FIG. 11 is a representation of a stateless protocol in accordance with the present invention.

Referring to FIG. 11, the stateless mechanism flow of control starts when a client sends an access request for a protected resource, 1000. A GPA server access packet is sent, 1005, and the GPA receives the client access request for the protected resource, 1010. A determination is made, 1015, to determine a policy response and the GPA server packet is sent, 1020. A server access response is received, 1025, and operation proceeds accordingly.

With respect to the stateless operation in FIG. 11, User Datagram Protocol (UDP) data transfer is used to create an access request to the GPA 105. The GPA 105 uses the policy manager to determine the level of access and response based on the best matching policy. If access is allowed, the response includes the encryption token that may be used to decrypt the resource the client is trying to obtain. The request and response are each connection-less and the packets are encrypted with predefined keys previously negotiated by the client and server. In this implementation, the ability to use an authentication method is not specified in the protocol, but may be added. The GPA 105 may default to a user based on information embedded in the packet for MAC and client IP addresses which may be associated with a user group.

In contrast to the stateless protocol, a stateful protocol uses a TCP connection oriented protocol to deliver GPA client requests. A client may keep this connection open for performance reasons and may issue multiple access requests over the same logical connection. The "Join" state allows a client to create an SSL connection to the server and may provide authentication to identify the user. If multiple users share a system, there must be multiple stateful connections to identify each individual user. Once the session is created in the Join state, the user may issue "Access" requests whenever a protected resource is being accessed. Multiple access requests may occur over a single logical connection. When the system or user has determined that GPA services are no longer required, e.g., when the system is shutting down, a "Leave" state is negotiated between the client and GPA. The Join, Access and Leave stateful operations are shown, respectively, in FIGS. 12A, 12B and 12C.

Figure 12A:
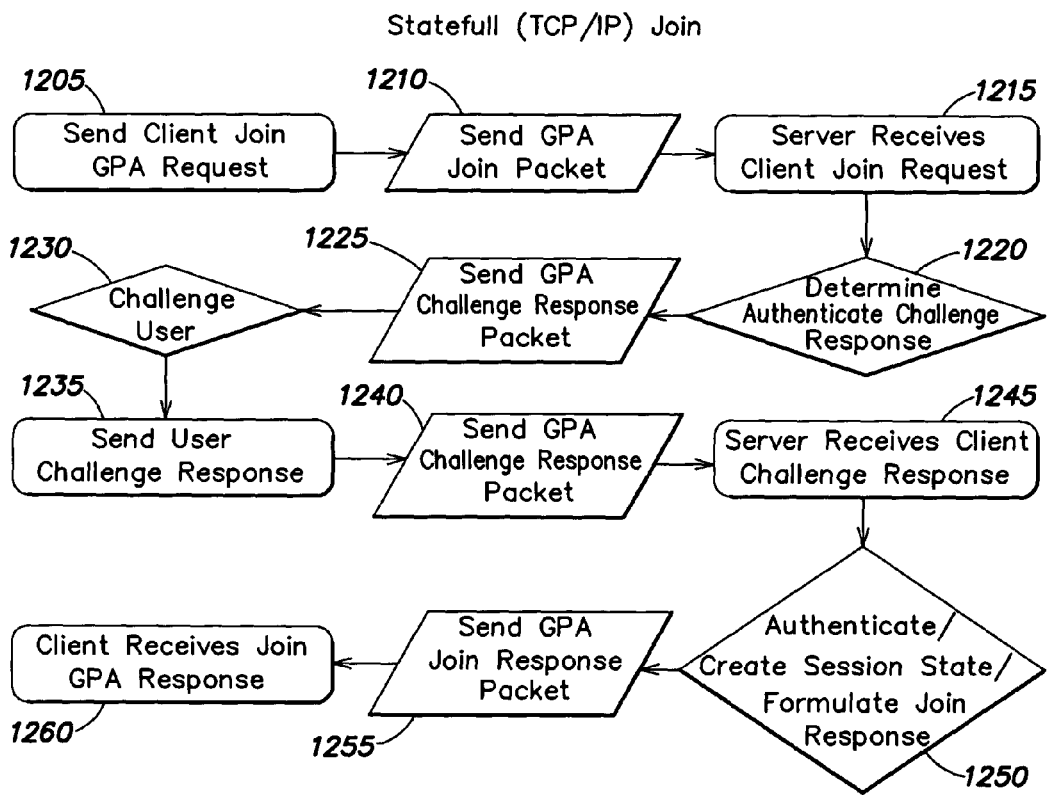
FIGS. 12A-12C represent, respectively, a stateful join, a stateful access and a stateful leave process.

In operation, with respect to FIG. 12A, a client GPA request to join is sent, 1205, with the GPA join packet being forwarded, 1210, from the client to the GPA 105. The client join request is received, 1215, and an appropriate authentication/challenge response is determined, 1220. The GPA challenge response packet is sent, 1225, to challenge the user 1230. The user responds by sending a user challenge response, 1235, which is sent as a GPA challenge response packet, 1240. The GPA 105 receives the client challenge, 1245, and authenticates, if appropriate, and creates a session state and formulates a joint response, 1250. The GPA join response packet is sent, 1255, and the client receives the join GPA response, 1260.

Figure 12B:
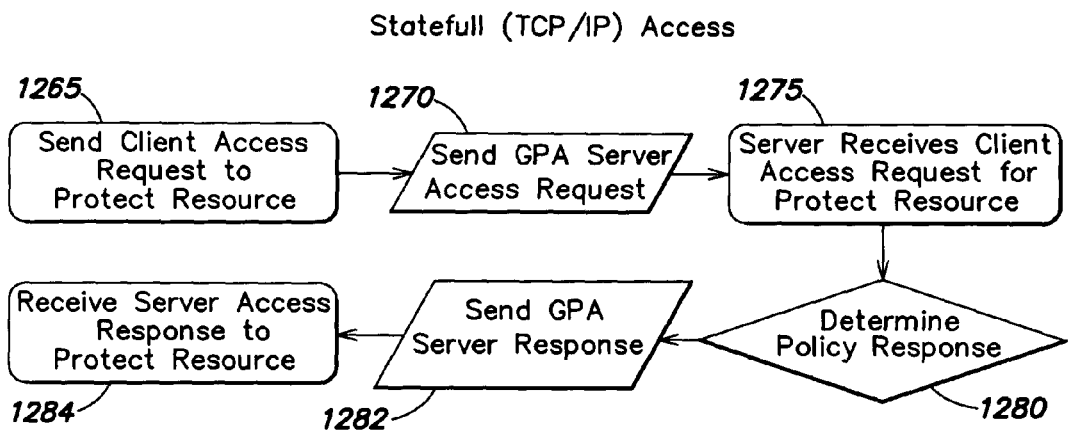

As has been described above, once a session is created and in the join state an access request may be issued, FIG. 12B, where a client access request to protect a resource is sent, 1265, as a GPA server access request, 1270. The GPA 105 receives the client access request for a protected resource, 1275, and determines a policy response, 1280. The determined policy response is sent as a GPA server response, 1282, and received by the requesting client, 1284. In the case of relay access, the client may use a thread that blocks waiting for the GPA 105 to inform it of a relay operation. The result of the response is an encrypted resource stream that identifies the operation to which the stream is in response. The client uses the information passed from the GPA 105 to map it to the local system request, receive the protected resource and store it in the correct location.

Figure 12C:
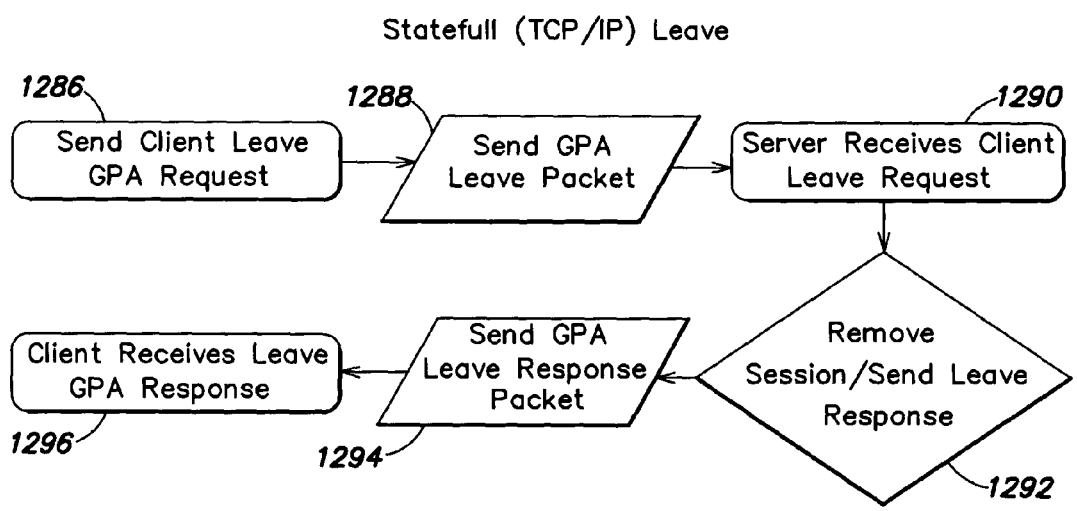

As above, when GPA services are no longer required, a leave state is negotiated as per the flowchart of FIG. 12C. Initially, a client leave GPA request is sent, 1286, as a GPA leave packet, 1288. The GPA 105 receives the client leave request, 1290, and removes the session and at the same time sends the GPA leave response, 1292, as a GPA leave response packet, 1294. This GPA leave response packet is received by the client as the leave GPA response, 1296.

Figure 13:
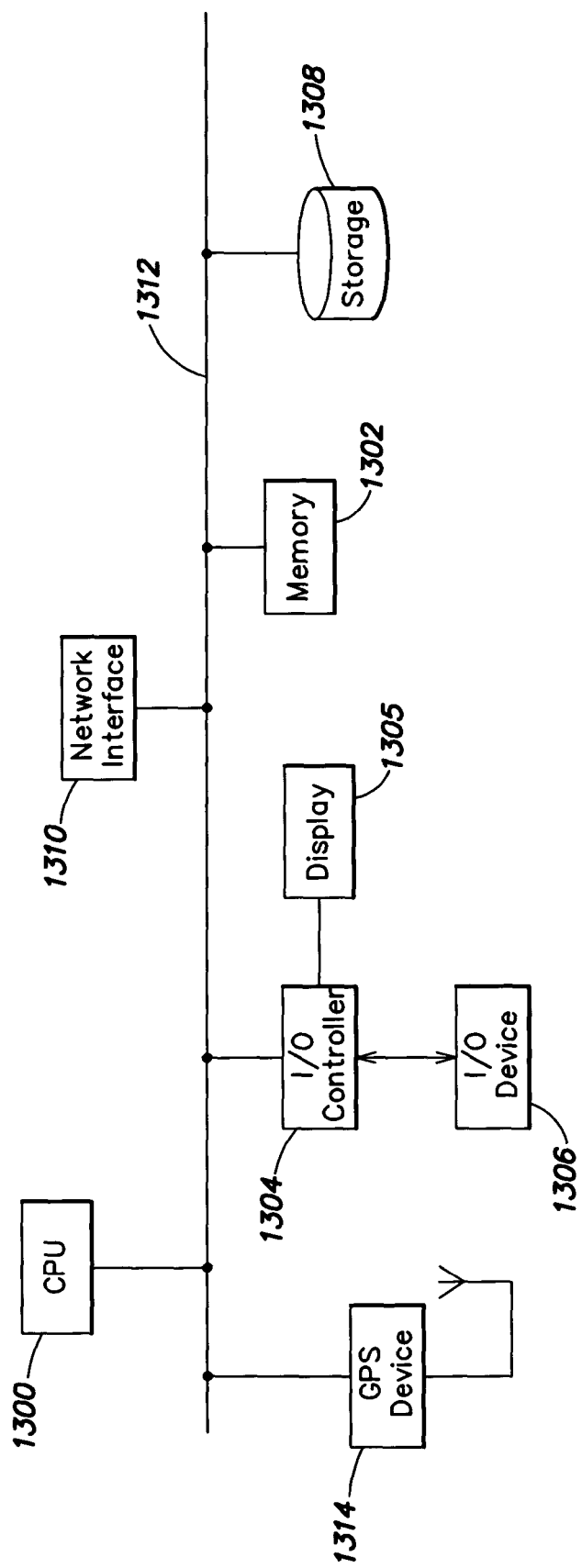
FIG. 13 is a block diagram of a device connected to a network in accordance with one embodiment of the present invention.

A client 120, 125 or server 115, in addition to the GPA 105 can be any one of a number of different devices, however, these devices have some components and/or functionality in common irrespective of their relative technical complexities. As shown in FIG. 13, these devices include a central processing unit 1300; a memory 1302; an input/output device or controller 1304 to couple to an IO device 1306, e.g., a keyboard, keypad or touch screen; a mass storage device 1308, e.g., a hard disk drive; and a network interface 1310 for communicating to a network. A bus 1312 couples these devices to one another to allow communication between them. Further, with respect to the mobile devices, a GPS device 1314 to provide global positioning system information is also included. The IO controller 1304 may also be coupled to a display device 1305. One of ordinary skill in the art will understand that not all of the devices will have each of these components, for example as has been referenced above, a stationery server 115 may not include a GPS device 1314.

A software implementation of the above described embodiments may comprise a series of computer instructions fixed on a tangible medium, such as a computer readable media, e.g. diskette, CD-ROM, ROM, or fixed disc.

The series of computer instructions embodies all or part of the functionality previously described herein with respect to the various embodiments of the present invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be (a) distributed as a removable media with accompanying printed or electronic documentation (e.g., shrink wrapped software), (b) preloaded with a computer system, e.g., on system ROM or fixed disc, or (c) distributed from a server or electronic bulletin board over a network, e.g., the Internet or World Wide Web.

What is claimed is:

1. A method of controlling access to a secure file located on a first system, the method comprising:
   receiving by a Global Positioning Authority (GPA) system connected to the first system over a network, from a requesting entity on the first system, a request packet comprising a request for access to the secure file located on the first system, the request packet including at least location information of the requesting entity, wherein the location information of the requesting entity is a function of a Global Positioning System signal;
   determining, as a function of information within the request packet, whether the request for access is allowed; and
   if it is determined that access is allowed, returning a request response packet to the requesting entity from the GPA system, the request response packet comprising a decryption key for decrypting the secure file.

2. The method of claim 1, wherein the determining comprises:
   parsing the request packet to identify at least one data portion comprising at least one of:
      an identity of the requesting entity;
      a type of access being requested;
      location information regarding the secure file;
      an attribute of the secure file;
      location information regarding the requesting entity;
      a date of the request;
      a time of the request;
      information regarding a location of the first system from which the request is being sent; and
   accessing a policy store to determine, as a function of one or more of the parsed data portions, if the access request will be granted.

3. The method of claim 2, further comprising:
   if it is determined that the access request will be granted, accessing an encryption key store to return the decryption key to decrypt the secure file,
   wherein accessing the encryption key store is a function of at least one of:
      the identity of the requesting entity; and
      an attribute of the protected resource secure file.

4. The method of claim 2, wherein at least one of a) the location information regarding the secure file, and b) the information regarding the location of the first system comprises location data that is a function of a Global Positioning System signal.

5. An apparatus comprising a processor and a memory for controlling access to a secure file located on a first system, the apparatus comprising:
   means for receiving by a Global Positioning Authority (GPA) system connected to the first system over a network, from a requesting entity on the first system, a request packet comprising a request for access to the secure file located on the first system, the request packet including at least location information of the requesting entity, wherein the location information of the requesting entity is a function of a Global Positioning System signal;
   means for determining, as a function of information within the request packet, whether the request for access is allowed; and
   means for returning a request response packet to the requesting entity from the GPA system if it is determined that access is allowed, the request response packet comprising a decryption key for decrypting the secure file.

6. The apparatus of claim 5, wherein the means for determining comprises:
   means for parsing the request packet to identify at least one data portion comprising at least one of:
      an identity of the requesting entity;
      a type of access being requested;
      location information regarding the secure file;
      an attribute of the secure file;
      location information regarding the requesting entity;
      a date of the request;
      a time of the request;
      information regarding a location of the first system from which the request is being sent; and
   means for accessing a policy store to determine, as a function of one or more of the parsed data portions, if the access request will be granted.

7. The apparatus of claim 6, further comprising:
   means for accessing, if it is determined that the access request will be granted, an encryption key store to return the decryption key to decrypt the secure file,
   wherein the accessing means accessing the encryption key store is a function of at least one of: the identity of the requesting entity; and an attribute of the secure file.

8. The apparatus of claim 6, wherein at least one of: a) the location information regarding the secure file, and b) the information regarding the location of the first system comprises location data that is a function of a Global Positioning System signal.

9. A computer program product for controlling access to a secure file located on a first system, the computer program product comprising a nontransitory computer usable storage medium having computer readable program code thereon, including:
   program code for receiving by a Global Positioning Authority (GPA) system connected to the first system over a network, from a requesting entity on the first system, a request packet comprising a request for access to the secure file located on the first system, the request packet including at least location information of the requesting entity, wherein the location information of the requesting entity is a function of a Global Positioning System signal;
   program code for determining, as a function of information within the request packet, whether the request for access is allowed; and
   program code for returning a request response packet to the requesting entity if it is determined that access is allowed from the GPA system, the request response packet comprising a decryption key for decrypting the secure file.

10. The computer program product of claim 9, wherein the program code for determining comprises:
    program code for parsing the request packet to identify at least one data portion comprising at least one of:
       an identity of the requesting entity;
       a type of access being requested;
       location information regarding the secure file;
       an attribute of the secure file;

location information regarding the requesting entity;
a date of the request;
a time of the request;
information regarding a location of the first system from which the request is being sent;
program code for accessing a policy store to determine, as a function of one or more of the parsed data portions, if the access request will be granted; and
program code for accessing an encryption key store to return the decryption key to decrypt the secure file once it is determined that the access request will be granted wherein accessing the encryption key store is a function of at least one of: the identity of the requesting entity; and an attribute of the secure file.

11. The computer program product of claim 10, wherein at least one of: a) the location information regarding the secure file, and b) the information regarding the location of the first system comprises location data that is a function of a Global Positioning System signal.

* * * * *

UNITED STATES PATENT AND TRADEMARK OFFICE
CERTIFICATE OF CORRECTION

PATENT NO. : 8,312,064 B1
APPLICATION NO. : 11/126663
DATED : November 13, 2012
INVENTOR(S) : William J. Gauvin Page 1 of 1

It is certified that error appears in the above-identified patent and that said Letters Patent is hereby corrected as shown below:

In the Claims

In Column 19, Line 52, Claim 3, delete "protected resource".

Signed and Sealed this
Twenty-second Day of October, 2013

Teresa Stanek Rea
*Deputy Director of the United States Patent and Trademark Office*